July 6, 1965  G. S. WALKER  3,193,667
ERROR CHECKING CIRCUIT FOR ELECTRONIC COUNTERS
Filed Nov. 6, 1961  5 Sheets-Sheet 1

Fig. 1.

Inventor
GEORGE S. WALKER
By
Cameron, Kerkam & Sutton
Attorneys

United States Patent Office 3,193,667
Patented July 6, 1965

3,193,667
ERROR CHECKING CIRCUIT FOR
ELECTRONIC COUNTERS
George Sanderson Walker, Edinburgh, Scotland, assignor to Ferranti, Limited, Hollinwood, Lancashire, England, a company of Great Britain and Northern Ireland
Filed Nov. 6, 1961, Ser. No. 150,502
Claims priority, application Great Britain, Nov. 15, 1960, 39,121/60
7 Claims. (Cl. 235—153)

This invention relates to electronic counters of electrical pulses and specifically to falt-indicating systems for them.

Such counters are liable to faults occurring in the counter itself, such as failing to record a pulse, or counting two pulses where only one has been received. It is known to check for these faults by providing a monitoring counter fed by the same pulses but operating on a different system—and preferably on a different numerical sale—so as not to be likely to have the same faults. Any disparity between the respective counts at any given moment is an indication of a fault—either in the main counter or in the monitor—which requires correction. This arrangement may be satisfactory as regards the actual checking but has nevertheless the disadvantage that the monitoring counter must have the same capacity as the main counter. Further, where the monitor works on a different numerical scale, the scale conversion apparatus necessary to allow comparison of the respective counts must also have the full capacity. Such a checking arrangement accordingly requires roughly the same amount of equipment, if not more, than is required for the main counter.

Where the pulses are derived from some other waveform—for example, by threshold-gating a sine wave—faults may also occur through the falling in amplitude of the originating wave, thereby causing the pulse train to be suddenly cut off when the originating wave falls below the gating level. The result is that the counter ceases to respond although the phenomenon to which it is supposed to be responding is still in operation. The normal form of monitoring system, as above described, would not indicate such a fault, since the pulse supply to the monitoring counter would fail at the same time as that to the main counter.

An object of the present invention is accordingly to provide a fault-indicating system for an electronic counter which is somewhat more economical in components than such systems as hitherto disclosed.

Another object is to provide such a system which includes provision for indicating faults which originate, as above described, at the wave form from which the pulses are derived.

In accordance with the present invention, apparatus for checking an electronic counter of electrical pulses which operates on a scale $N$ and has for each power of $N$ to the limit required an array of $N$ digit representing stages includes a first scale-of-$m$ residue computer, where $m$ is an integer such that the residue of $N$ to modulus $m$ is unity, for supplying at any given moment a first computed signal to represent the residue to modulus $m$ of the algebraic total of pulses delivered to the counter up to that moment, for each array of the counter a residue network arranged to supply at any given moment an array residue signal to represent the residue to modulus $m$ of the digit held in that array at that moment, a second scale-of-$m$ residue computer for supplying at any given moment a second computed signal to represent the residue to modulus $m$ of the algebraic sum of the residues represented by the array residue signals at that moment, the sign of the residue derived from each array of an odd-numbered power of $N$ being negative where the said unity residue is negative, and a comparator arranged to compare the first and the second computed signals and to derive a response when the residues represented by them are unequal.

The invention is based on the residue theorem which states that where $N$ and $m$ are integers and the residue of $N$ to modulus (mod) $m$ is unity—that is to say, the remainder left after dividing $N \pm 1$ by $m$ is zero—then (again to mod $m$) the residue of any whole number is equal to the residue of the algebraic sum of the residues of the respective digits of that whole number expressed in the scale of $N$, the residues of each digit of an odd-numbered power having a negative sign where the unity residue above mentioned has a negative sign.

A few simple numerical examples should make the meaning of the theorem clear.

*Example 1*

The unity residue is positive—that is, $N = +1$ mod $m$ (meaning that $N-1$ is an integral product of $m$). Assume $N=10$; then a suitable value of $m$ is 3, since the residue left after dividing 10 by 3 is $+1$.

Take the number represented in the $N$ (decimal) scale by 524. The residue of this to mod 3 is clearly 2. The residues of the respective digits are 2, 2, and 1. The sum of these is 5, the residue of which to mod 3 is 2—the same as the residue of the whole number.

*Example 2*

Unity residue negative. $N=5$; hence $m$ may again be 3, since the residue of 5 to mod 3 is 2, which may be expressed by the complement $-1$. In other words, $N+1$ is an integral product of 3.

Take the number 243 in the $N$ scale. In the decimal scale this is $2 \times 5^2 + 4 \times 5 + 3 = 73$, the residue of which to mod 3 is 1. Here the digits in the $N$ scale are 2, 4, and 3 having residues 2, 1, and 0 respectively. In this case as the unity residue is negative, the digit residues of each odd power have to be subtracted. Thus the algebraic sum of the digit residues is $2-1+0=1$, giving an overall residue 1, which is equal to that of the whole number.

*Example 3*

Unity residue negative. $N=11$; $m=4$.

Take the number 467 in the $N$ scale. In the decimal scale this is $4 \times 11^2 + 6 \times 11 + 7 = 557$. The residue of this to mod 4 is 1. The algebraic sum of the digit residues in the 11 scale is $0-2+3$, which is again equal to the residue of the whole number.

The invention will first be described by way of example with reference to the accompanying drawings in which.

Figure 1:
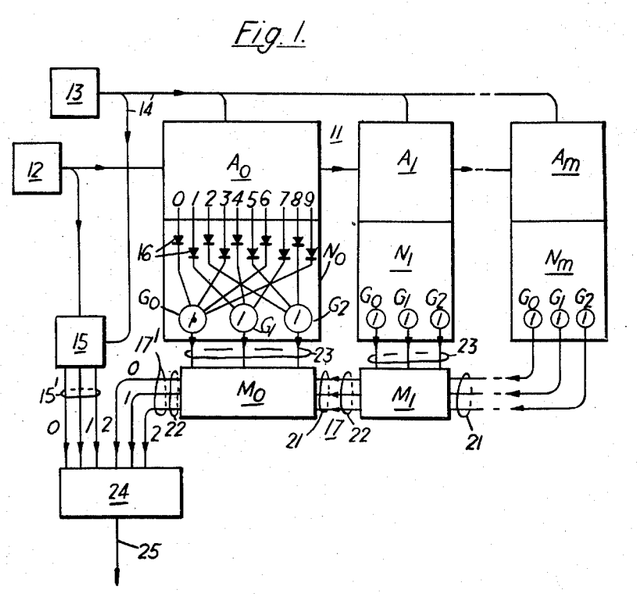
FIGURE 1 is a diagram, partly schematic, of one embodiment of the invention.

In carrying out the invention as using the positive unity residue system (illustrated by the above Example 1) for checking the performance of a bi-directional decimal counter, see FIG. 1, the counter, which is shown generally at 11, is in the usual form of an array of digital stages for each power of ten to the limit required, with carry arrangements between adjacent arrays. Only the units and tens arrays $A_0$ and $A_1$ and the most significant stage $A_m$, are depicted. The pulses to be counted are derived from some source 12 and applied to the lowest array $A_0$. The expressions "lower," "higher," and the like, as applied to an array, should be understood as referring to its power significance relative to those of other arrays. Whether a pulse is added to or subtracted from the count is determined at some source 13 which exercises its control of the counter over an Add/Subtract channel 14 connected to all the arrays. The counter may be in the form disclosed in the co-pending patent application of Ronald Robert HcLaren, Serial No. 49,186, now abandoned.

The pulses from source 12 are also applied to a first ternary residue computer 15, the counting direction of which is also controlled by source 13. This computer is aranged to supply at any given moment a first computed signal which represents the residue to mod 3 of the total which should then be in the counter; this total is the algebraic sum of all the pulses applied to the counter, the number of those that were to be subtracted having been subtracted from the number of those that were to be added. The computed residue signal is in the form of the distinctive energisation of the appropriate one 0, 1, or 2 of the group of computer output leads $15^1$. This distinctively energised lead, which will hereinafter be referred to as the distinctive lead, may for example be distinguished by being energised in a certain sense, whereas the other two leads are either energised in the opposite sense or at another potential, such as earth potential; or the distinctive lead may itself be at earth potential, whereas the other two leads are energised.

It will be appreciated that as the computer computes only a residue—that is, a remainder—it requires only a single-stage store, and so needs very much less equipment than the counter itself. A single-power ternary counter, controllable in direction from source 13, is all that is necessary for computer 15, the three output leads being taken from the respective digit stages 0, 1, and 2.

Array $A_0$ of the counter is provided with an array residue network $N_0$ to supply at any given moment an array residue signal to represent the residue to mod 3 of the number represented by whichever digit is held in the array at the moment. The network consists of leads from each stage 0 to 9 inclusive (by way of diodes 16 to prevent intercoupling) to the appropriate one of a group 23 of control leads 0, 1, and 2 by way of OR gates $G_0$ to $G_2$ respectively, so that each array residue signal may be represented by a distinctive energisation of the appropriate one of those leads, just as the computed signal from computer 15 is represented by a distinctive energisation of the appropriate one of leads $15^1$. Thus digit stages 0, 3, 6, and 9 are connected as inputs to gate $G_0$, since the residue to each of these numbers to mod 3 is zero; similarly digit stages 1, 4, and 7 (residue 1) are connected to gate $G_1$, and stages 2, 5, and 8 to gate $G_2$.

Where the counter is in the form in which each digit stages includes a bi-stable pair of transistors, the connection from the stage to the appropriate gate is taken from that one of the stage's transistor output circuits which, when the stage holds a digit, applies the required distinctive energisation to the control lead from that gate.

Where the counter is in the form of an assembly of electrodes swept by an electron beam, each electrode forming part of a digit stage, the connection to each gate may be taken from the circuit of the appropriate electrode, with, if necessary, some adjustment of potential to supply the distinctive energisation.

If more convenient, each of diodes 16 may be included as part of the gate G to which it is connected.

Array $A_1$ and each higher array, including array $A_m$, is similarly provided with a residue network $N_1$, $N_2$ . . . $N_m$, as the case may be, each with OR gates $G_0$ to $G_2$ to the respective inputs of which the stages of the corresponding array are connected through diodes 16 as above described, the gates leading to control leads 23.

To derive a second computed residue signal for comparison with that derived by computer 15 there is provided a second ternary residue computer 17. This includes for each array $A_0$, $A_1$, etc. except the highest, $A_m$, a gating matrix $M_0$, $M_1$, etc. as the case may be.

Each matrix includes three input leads 21 and three output leads 22, and the group 23 of the three control leads from gates $G_0$ to $G_2$ of the associated array, the three leads of each group representing the ternary residues 0, 1, and 2 respectively. The matrix is arranged, as described in more detail below, so as to energise distinctively that one of output leads 22 which represents the residue to mod 3 of the sum of the residues represented by the two distinctive ones of leads 21 and 23, the term "distinctive" having a similar meaning to that indicated above with reference to computer output leads $15^1$. For example, where the distinctive input lead is lead 2 and the array holds digit 7 (so that the distinctive control lead is lead 1 from gate $G_1$), the distinctive output lead is lead 0.

The input leads to each matrix are connected each to the corresponding output leads from the matrix of the next higher array, the output leads 0 to 2 from the highest array being connected direct to the coresponding gates $G_0$ to $G_2$ of that array.

The group of output leads 22 from matrix $M_0$ serves as the group of output leads $17^1$ from the whole computer 17 and so carries the second computed residue signal, as represented by the distinctive one of the leads, for comparison with the first computed signal, as represented by the distinctive one of leads $15^1$. Leads $17^1$ are accordingly connected, together with the group of leads $15^1$ from computer 15, to some sort of comparator 24 which responds over a lead 25 wherever the distinctive one of the respective input leads are not alike—that is, when the residues derived by the two computers 15 and 17 are not the same. Various forms of simple logical stage are available for this comparator.

The operation will be described on the assumption that there are only three arrays (array $A_m$ being the hundreds array) and that to begin with the number in the counter is 287. As this leaves a residue 2 to mod 3, the distinctive lead from computer 15 is lead 2. In arrays $A_0$, $A_1$, and $A_2$, the stages which hold digits are stages 7, 8, and 2 respectively. Hence in those arrays the OR gates which pass a signal are gates $G_1$, $G_2$, and $G_2$ respectively. Leads 1, 2, and 2 of the respective groups of control leads 26 are therefore the distinctive leads.

Considering first matrix $M_1$ the distinctive input lead of group 21 from the next higher array is lead 2 (from gate $G_2$ of array $A_m$). The distinctive control lead from the array itself ($A_1$) is lead 2. The sum of these two residue-representing quantities is 4, leaving the further residue 1. Hence the distinctive output lead of group 22 from matrix $M_1$ is lead 1.

In matrix $M_0$ the input and control digits are 1 (the output from matrix $M_1$) and 1 (from gate $G_1$ of array $A_0$), with the result that output lead 2, and hence lead 2 of group $17^1$ to the comparator, are each distinctive.

Thus the two distinctive leads of groups $15^1$ and $17^1$ to the comparator represent the same residue and accordingly no output signal is derived. The circuit constants of the system should be such that the distinctive energisation which in the appropriate one of leads 15 represents the first computed residue signal sufficiently corresponds to the distinctive energisation which represents the other residue signal for the comparator to operate in this manner.

If at any time the counter misses a pulse, or counts two in response to one, there will be disparity of residues at the comparator, which will give a response to indicate the error.

Figure 2:
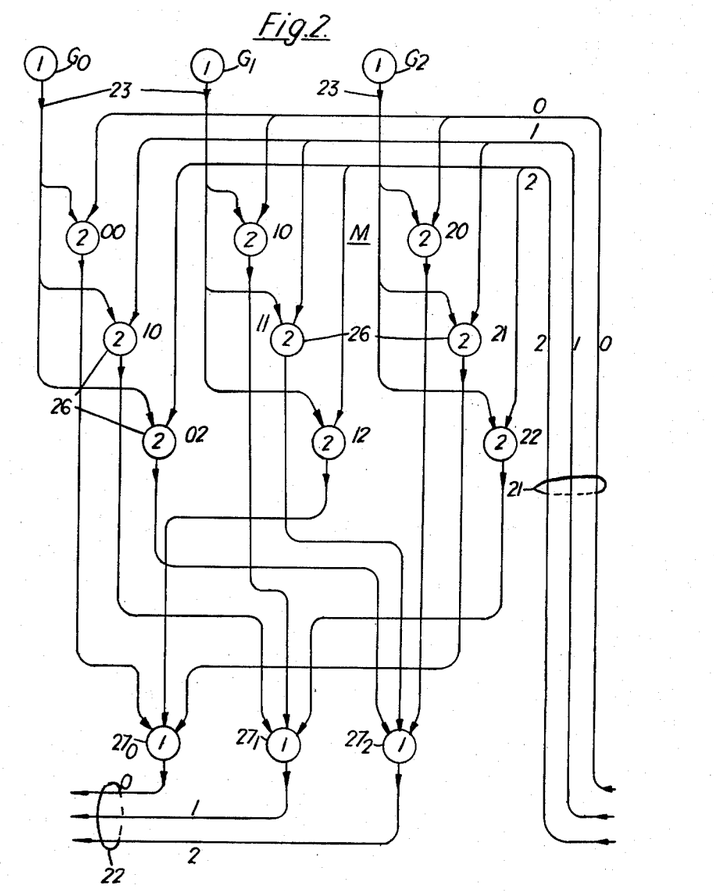
FIGURE 2 is a circuit diagram showing more in detail a component shown generally in FIGURE 1.

A form of gating matrix suitable for any array but the highest is shown in FIG. 2. Each lead 0, 1, 2 of the input channel 21 is connected as one of the inputs to each of three two-entry AND gates 26 to the other input of which is connected one of the control leads 23 so that the nine gates between them include every two-input combination of input and control lead. Each gate is designated in the drawing by the two numbers which represent the residue digits of the control lead and input lead (in that order) which serve as inputs to the gate. Thus gate 02 has its inputs derived from control lead 0 and input lead 2.

The output from each gate is connected to that one of output leads 22 which represents the residue to mod 3 of the sum of the two input digits to the gate. Thus gate 02 is connected to output lead 2, gate 21 to output lead 0, gate 22 to output lead 1, and so on. Each such connection to an output lead is made by way of an OR gate 27 individual to that output lead, to prevent interaction. Thus the output leads from AND gates 00, 12, and 21 are connected to output lead 0 by way of an OR gate $27_0$, and so on.

The output leads 22 are connected as input leads 21 of the next lower matrix, or, in the case of the lowest matrix, to comparator 24.

Where the pulses are derived from a cyclic signal having a sine or other non-rectangular waveform, by a threshold-gating process as above described, a fall in the amplitude of the signal—due, for example, to dust obscuring a photocell from which it is derived—will have no effect until the amplitude falls below the gate level, when the pulses will suddenly cease. To derive a response which indicates this form of fault the arrangement of FIG. 1 may be modified as shown in FIG. 3, in which the components previously described are given the name reference characters.

This auxiliary checking system, in brief, derives the pulses for computer 15 at a higher threshold gating level than is used for deriving the pulses for the counter. Hence as the wave falls in amplitude the train of pulses to computer 15 ceases before the train to the main counter; this in turn causes a residue discrepancy at comparator 24, which gives a fault indication in the manner above described.

Unfortunately these different gating levels, taken in conjunction with the slope of the sinewave, necessarily cause each pulse for the counter to be generated at a different time from, and so be out of coincidence with, the corresponding pulse for computer 15. As a result, the residue signals applied to the comparator over leads $15^1$ will be out of synchronism with those arriving over leads $17^1$, and a fault indication will be given where none exists. The arrangement of FIG. 3 is designed to prevent such misoperation.

Figure 3:
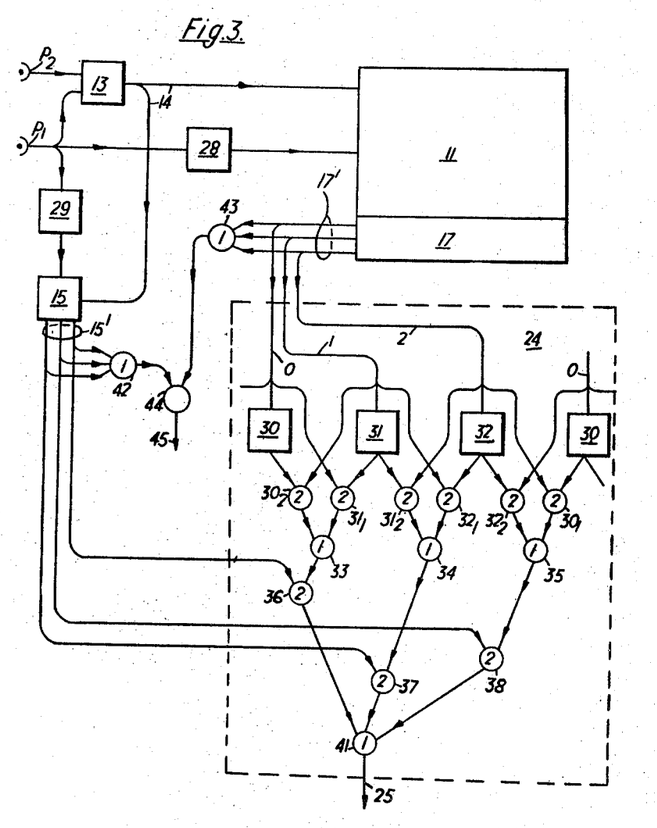
FIGURE 3 is a schematic diagram of a modified form of the embodiment of FIGURE 1, FIGURES 4, 5, 6, and 7 show portions of four further embodiments respectively.

Referring to FIG. 3, the source of the sinewave is depicted as a photocell $P_1$, responsive to, say, a fringe pattern which moves with a machine tool. The output from the cell is applied to threshold gates 28 and 29 from which are derived, by gating the wave at different levels, the pulses for the counter 11 and computer 15 respectively. To enable the direction of the count to be dependent on the direction of tool movement—and hence of sinewave—movement a second photocell $P_2$ is provided to respond to the pattern at a different location. The two cells are connected to the Add/Subtract source 13 to generate the Add/Subtract control signals for channels 14 to the counter and computer.

Comparator 24 includes a ring array of three monostable stages 30 to 32 connected for actuation to leads 0 to 2, respectively, of group $17^1$. Each of these stages is arranged to be triggered by the cessation of the residue signal on the corresponding one of leads $17^1$, and to generate when triggered a pulse of a length which will be indicated later. Thus stage 30 is triggered when the residue signal from computer 17 changes from 0 to 1 for an upward count, and from 0 to 2 on a downward count. To clarify the drawing as regards the ring interconnections between these stages and the associated gates about to be described, stage 30 is depicted again on the right of stage 32.

The pulse output from stage 30 is applied as one of the inputs to each of two two-entry AND gates $30_1$ and $30_2$. Stage 31 is similarly connected to gates $31_1$ and $31_2$, and stage 32 to gates $32_1$ and $32_2$. The second inputs to gates $30_1$, $31_1$, and $32_1$ are supplied by the group $17^1$ leads 2, 0 and 1 respectively, whereas the second inputs to gates $30_2$, $31_2$, and $32_2$ are supplied by the group $17^1$ leads 1, 2, and 0 respectively. The outputs from gates $30_2$ and $31_1$ are applied through an OR gate 33 to the input of a two-entry AND gate 36 the other input of which is supplied by lead 2 of the group $15^1$. Similarly gates $31_2$ and $32_1$ are connected through an OR gate 34 to an AND gate 37 with lead 0 of group $15^1$, and gates $32_2$ and $30_1$ through an OR gate 35 to an AND gate 38 with lead 1 of group $15^1$. The outputs from gates 36 to 38 are applied as inputs to an OR gate 41 the output from which is delivered to lead 25 from the comparator.

This checking system relies on the fact that whilst during correct operation the residue signal from computer 15 is, say, 2, that from computer 17 can never have just changed from 0 to 1 on an upward count or from 1 to 0 on a downward count. During such an upward change, a pulse output from stage 30, generated by the cessation of a residue signal 0 in group $17^1$, co-exists at gate $30_2$ with the newly-established residue signal 1. Gate $30_2$ accordingly passes a signal through gate 33 to gate 36, where it is blocked unless a signal co-exists at the other input to that gate constituted by lead 2 of group $15^1$. Thus a signal is passed through to lead 25 only if the fault condition arises in which the residue signal from computer 15 is 2 at a time when the residue signal from computer 17 has just become 1 on an upward count.

During a downward count from 1 to 0, it is gate $31_1$ which passes a coincidence signal through to gate 36, which signal is also blocked unless lead 2 of group $15^1$ is energised.

Similar logical connections, as described above with respect to FIG. 3, are made for deriving a fault indication over lead 25 if the residue signal from computer 15 is 0 or 1 at a time when the residue signal from computer 17 has just changed in either direction between 1 and 2 or between 2 and 0, as the case may be.

If now the input sinewave falls below the higher threshold level, with the result that the pulses cease to reach computer 15 whilst continuing to reach the counter, the last residue count of computer 15 is preserved by the steady distinctive energisation of the appropriate one of leads $15^1$ whereas the residue signal from computer 17 continues to change as the pulses continue to reach the counter. Thus a discrepancy condition will quickly be reached in comparator 24, which accordingly gives the required fault indication.

The duration of each pulse generated by one of the monostable stages 30 to 32 on being triggered should be such as to ensure actuation of the fault response equipment, but should be less than the interval between successive pulses at the fastest rate of operation of the counter.

If for any reason one of the counter arrays fails to hold any digit, not even the zero digit, thereby interrupting the chain of open gates through the matrices, comparator 24 will cease to receive any signal from computer 17 and so will give no fault indication over lead 25. To provide an indication of such a black-out condition the leads of group $15^1$ and $17^1$ are connected through respective OR gates 42 and 43 to form the two inputs to a gating stage 44, designed to pass a warning signal over output lead 45 unless both input leads carry a residue signal. Stage 44 may conveniently include a two-entry AND gate arranged to receive the signals from gates 42 and 43, together with an inhibit gate arranged to pass a warning signal over lead 45 unless blocked by an output signal from the AND gate.

Counters working to other scales may also be checked in the manner described, provided that the respective scales of the counter and monitor are in accordance with the residue theorem above stated.

For example, again where the unity residue is positive, a ternary monitor may also be used to check a scale-of-four (quaternary) counter.

Figure 4:
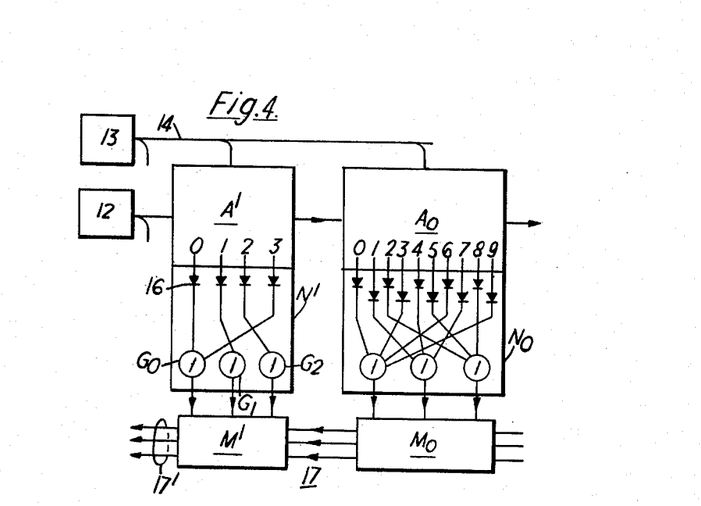

This has an important application where a single-power quaternary counter precedes the lowest array of a multi-power decimal contour so that the counter as a whole operates on two different scales in cascade, reading down to quarters of a unit. Such an arrangement is shown in FIG. 4, in which the quaternary array, preceding the lowest decimal array $A_0$, is designated $A^1$.

The monitoring arrangements in accordance with the invention, which it will be seen form a combined ternary/decimal and ternary/quaternary system, include for array $A^1$ an array residue network $N^1$ having three OR gates $G_0$ to $G_2$, as in each network $N_0$ to $N_m$. The connections to these gates (through diodes 16) from the respective digit stages are made on the same principle as with a decimal array: digits 0 and 3 to gate $G_0$, and digits 1 and 2 to gates $G_1$ and $G_2$ respectively.

Computer 17 is provided with a matrix $M^1$ for array $A^1$ which is of exactly the same form as matrix $M_0$ and is coupled up to it and to network $N^1$ as if it were a matrix for a decimal array. The output leads from matrix $M^1$ serve now as the output leads $17^1$ of the computer, in place of the output leads from matrix $M_0$.

The operation of this system is the same in principle as that of the system of FIG. 1, with computer 17 now handling the residues from the quaternary counter as well as from the decimal counter, and deriving as before a computed signal to represent the residue to mod 3 of the sum of the residues represented by all the array signals.

An embodiment of the invention which makes use of a unity residue of negative sense has application where it is desired to precede a decimal counter by a single power scale-of-five (quinary) counter so that the apparatus as a whole counts down to fifths of a unit. From numerical Example 2, given above, it will be seen that the ternary counter which may be used to monitor the main (decimal) counter may also be used to monitor the quinary counter. It can easily be demonstrated mathematically that where, as in this arrangement, two systems working respectively to unity residues of negative and of positive sense are combined, the overall residue of the counter working to the positive residue must be subtracted from that of the other counter, any resulting residue of negative sense being represented by the positive complement with respect to the modulus. The arrangement and operation of such a system will be made clearer by the following description of a quinary/decimal counter in accordance with the invention.

Figure 5:
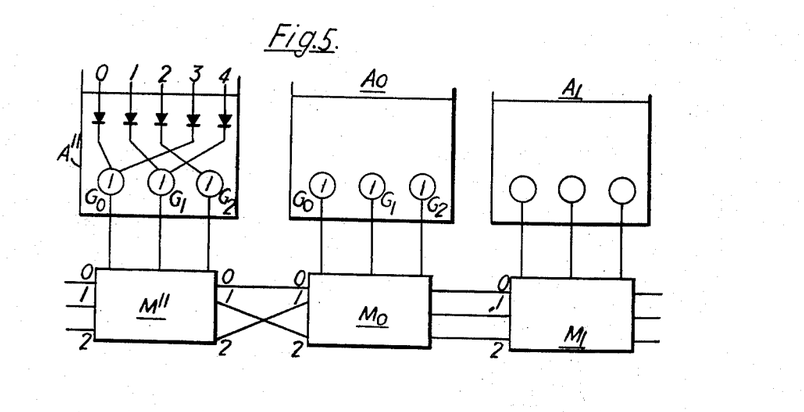

The arrangement—see FIG. 5—is generally similar to that of FIG. 4 but with the latter's quaternary array $A^1$ replaced by a single-power quinary array $A^{11}$. The digit stages 0 to 4 of this array are connected to the OR gates $G_0$ to $G_2$ of the associated array remainder network $N^{11}$ on the same principle as the digit stages of array $A_0$ (FIG. 1) are connected to its OR gates—namely digits 0 and 3 to gate $G_0$, digits 1 and 4 to gate $G_1$, and digit 2 to gate $G_2$. The corresponding matrix $M^{11}$ is as already described with reference to FIG. 2. Subtraction of the residue of this array from the overall residue of the arrays $A_0$ to $A_m$, the respective matrices of which are interconnected exactly as described above, is effected merely by interchanging leads 1 and 2 as they pass from matrix $M_0$ to matrix $M^{11}$, leaving the 0 leads unchanged. Hence—referring to FIG. 2—lead 1 from matrix $M_0$ is connected in matrix $M^{11}$ to the inputs of gates 02, 12, and 22, whereas lead 2 is connected to the inputs of gates 01, 11, and 21. The rest of the apparatus may be as described with reference to FIG. 1.

The operation of this embodiment will be indicated by a numerical example. Suppose that the number held by the counter at a particular moment is "17⅘." This will be the condition of the counter after receiving 89 successive positive pulses. The residue held by the first computer 15 is 2. The digit held in quinary array $A^{11}$ is 4, giving a residue 1. From this must be subtracted the overall residue of the decimal counter, which is 1+1, or 2. Hence the overall residue from the combined counters is −1. The complement of this to the modulus number 3 is +2. Thus the residue derived by the second computer 17 is the same as that derived by computer 15, thereby indicating correct operation.

The subtractive action due to the changed-over leads between matrices $M_0$ and $M^{11}$ will be clearly seen. With decimal digits 1 and 7 held in arrays $A_1$ and $A_0$, the distinctive output lead from matrix $M_0$ is lead 2. In matrix $M^{11}$ gate $G_1$ is applying a residue signal to gates 10, 11, and 12 (FIG. 2). The only one of these to which output lead 2 from matrix $M_0$ is connected is gate 11, allowing for the changed-over inputs to this matrix. Hence gate 11 renders output lead 2 from matrix $M^{11}$ distinctive to represent the overall residue of the combined counters.

The next positive pulse brings the total to 90, leaving the counters with the display "18." Computer 15 now has the residue 0. The overall residue of the decimal arrays is also 0, and so is the residue of the quinary computer. Thus the residues of computer 15 and 17 agree as before.

It will be seen that when in this arrangement a carry takes place between arrays $A^{11}$ and $A_0$, the residues of both arrays change in value—that of array $A^{11}$ from 1 to 0 (resulting from the change from digit 4 to digit 0) and that of array $A_0$ by the usual 1 to the next higher or next lower digit, unless of course the change in array $A_0$ is between digits 9 and 0. Should these changes not occur synchronously, the residue signal from computer 17 will momentarily be unequal to that from computer 15, with the result that an indication of error is given where none exists. To prevent such misoperation a stage may be provided to be so actuated by each pulse as to inhibit the action of the fault-indicating system at each pulse for just sufficient time to ensure that both such changes of residue signal have taken place. Such a stage is not necessary where the lowest array works to the decimal or quarternary system, for the change between 9 and 0, or 3 and 0, as the case may be, does not alter the value of the residue signal, there being accordingly not more than one change of residue signal throughout computer 17. To prevent this momentary inhibition registering as a black-out fault, some kind of time-constant network may be built into stage 44 of FIG. 3 so that a warning is not given over lead 45 except for black-outs which exceed a predetermined duration.

In each of the arrangements of FIGS. 4 and 5 the comparator may take the form described with reference to FIG. 3.

Subtraction may alternatively be effected by leaving the connections between the matrices as before and appropriately modifying either the connections in the residue networks between the digit stages of array $A^{11}$ and its gates $G_0$ to $G_2$, or the connections within matrix $M^{11}$.

To illustrate this method of subtraction as applied to a counter operating to only the one scale, a quinary counter operating up to the second power will now be described with reference to FIG. 6. As explained in numerical Example 2, this may be monitored by a modulus leaving a negative unity residue—such as mod 3.

The three arrays are shown at $A_0$, $A_1$, and $A_2$, with associated matrices M having corresponding suffixes. Other associated components may be as shown in FIG. 1 for the decimal counter.

For each power, the connections between the respective digit stages and associated gates $G_0$ to $G_2$ are exactly as shown for array $A^{11}$ in FIG. 5. Each matrix may be as shown in FIG. 2. As already explained, it is necessary in a system working to a negative unity residue that the digit residues in respect of the odd-numbered powers must be subtracted from those of the other powers. Here the only odd-numbered power is represented by array $A_1$, for the first power of 5. In the operation of computer 17, therefore, the digit residue from this array must be subtracted from those of the other two arrays. This is effected by changing over the 1 and 2 output leads from matrix $M_2$ to matrix $M_1$ and those from matrix $M_1$ to matrix $M_0$ as shown in FIG. 6.

In operation, with the quinary number 243 in the counter, as in numerical Example 2, residue signal over lead 2 from matrix $M_2$ joins with the signal from gate $G_1$ (residue 1) of array $A_1$ to distinctively energise output lead 2 from matrix $M_1$, and this signal in turn joins with the signal from gate $G_0$ of array $A_0$ to distinctively energise output lead 1 from computer 17—representing the correct overall residue 1.

Figure 6:
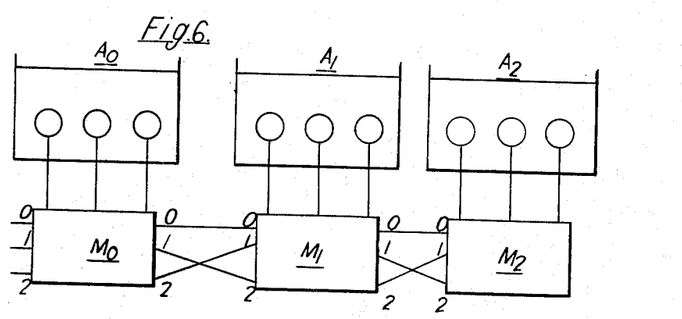

Various alternative methods of subtraction by modifying the inter-connections between the gates and the leads to form the electrical equivalent of the system of FIG. 6 may readily be devised.

Another system (not shown) based on a negative unit residue is that of a scale-of-eleven counter checked by a quinary monitor. Each array residue network now has five OR gates representing the remainder digits 0 to 4 respectively. To them are connected the digit stages of the array itself as follows: digits 0, 5, and 10 to the residue 0 gate; digits 1 and 6 to the residue 1 gate; digits 2 and 7 to the residue 2 gate; and so on. Similarly each matrix now has 25 two-entry AND gates and five each of the input, output, and control leads, the leads in each group representing the residue digits 0 to 4. As before, the gate input pairs cover all combinations of control and input leads, whilst each gate output is connected to that one of the output leads which represents the residue to mod 5 of the sum of the digits represented by the control lead and input lead connected to that gate. The first residue computer is now a single-power quinary counter, and the two input groups to the comparator are each of five leads. The operation of this system is sufficiently similar to that of the arrangement of FIG. 1 as not to require description.

Counting below zero— that is, negatively—is also practicable with a slight modification of the equipment. The need for some sort of modification will readily be understood from consideration of, for example, the embodiment of FIG. 1. If with the apparatus as there shown, the subtractive pulses continue to be applied after the counter has been stepped down to zero, that is, to the reading "000" (assuming for convenience a three-array counter), the next pulse produces the reading "999" (the complement of $-1$). The effect of this pulse would thus be to change the residue signal from computer 15 but not that from computer 17, since the residues of 0 and 9 to mod 3 are the same. Hence an undesired indication of a fault would be given.

Figure 7:
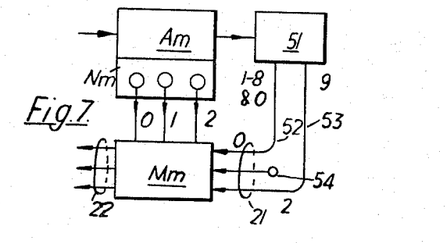

To prevent such misoperation, the apparatus of FIG. 1 may be modified as shown in FIG. 7. Associated with array $A_m$ is a binary counter 51 which has output leads 52 and 53 and which is so controlled from array $A_m$ that when the latter holds any of digits 0 and 1 to 8 output lead 52 is distinctive, whereas when array $A_m$ holds digit 9, lead 53 is distinctive. Array $A_m$ is provided with a gating matrix $M_m$ similar to the other matrices. Of the input leads 21 to this matrix, leads 0 and 2 are connected to leads 52 and 53, respectively, of counter 51, and lead 1 is connected to some point 54 energised by a source of bias potential which maintains the lead in the non-distinctive condition. Leads 23 are connected to the residue network $N_m$, as in the other matrices, whilst output leads 22 serve as the input leads 21 of the next lower matrix (not shown).

So long as array $A_m$ holds any digit but 9, only the 0 lead of the three inputs to matrix $M_m$ is distinctive, with the result that the operation is as first described with reference to FIG. 1. When the last array holds digit 9, on the other hand, counter 51 feeds a residue "2" into matrix $M_m$, with the result that in counting down beyond zero the change from "000" to "999" (assuming again a three-array counter) changes the residue from 0 to 2; as this is in accordance with the corresponding change of the residue signal from computer 15 there is no misoperation.

The addition of stage 51 limits the upward count to 899, since the next additive pulse would cause the residue signal from computer 17 to remain at 2 instead of changing from 2 to 0. For a similar reason the downward count below zero can extend only to 900 (the complement of $-100$). These limitations may well be tolerable, however, especially as the overall range of the count from $-100$ to $+899$ is as before.

Figure 8:
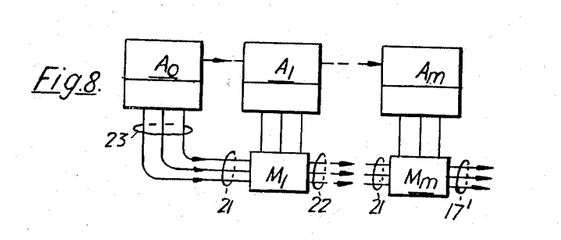
FIGURE 8 shows a part of the apparatus of FIGURE 1 modified in accordance with another embodiment.

In any of the above-described embodiments except that arranged for counting below zero, the leads $17^1$ to comparator 24 from computer 17 may alternatively be taken from the other end of the chain of counter arrays. In such an arrangement, the highest power array $A_m$ (see FIG. 8) is provided with a matrix $M_m$, whereas the lowest power array $A_0$ is not. The input leads 21 of matrix $M_1$ are connected, each to each, to the control leads 23 from network $N_0$ of array $A_0$, the output leads from the matrix being connected to the input leads of the matrix (not shown) of the next higher array. The output leads from matrix $M_m$ serve as the input leads $17^1$ to the comparator. Each matrix may be again as shown in FIG. 2, except that, for the diagram to accord with FIG. 8, the input leads 21 should come in from the left (as from the next lower array) and the output leads 22 go out to the right. The operation is otherwise as described with reference to FIG. 1.

It will readily be appreciated that as a fault-indicating system in accordance with the invention does not require a store equal in capacity to that of the counter itself, the system is economical in components compared with known systems in which the store has to be duplicated.

What is claimed:

1. Apparatus for checking an electronic counter of electrical pulses which operates on a scale N over at least two powers of N and has for each power of N to the limit required an array of N digit-representing stages including
   (a) a first scale-of-$m$ residue computer, where $m$ is an integer such that the residue of N to modulus $m$ is unity, for producing at any given moment a first computed signal to represent the residue to modulus $m$ of the algebraic total of pulses delivered to the counter up to that moment,
   (b) each array of the counter including a residue network arranged to produce at any given moment an array residue signal to represent the residue to modulus $m$ of the digit held in that array at that moment,
   (c) a second scale-of-$m$ residue computer to which the array residue signals are supplied by said residue networks for producing at any given moment a second computed signal to represrent the residue to modulus $m$ of the algebraic sum of the residues represented by the array residue signals at that moment, the sign of the residue derived from each array of an odd-numbered power of N being negative where the said unity residue is negative, and
   (d) a comparator to which the first and second computed signals are supplied by said computers, said comparator being operative to compare said signals and to derive a response when the residues represented by them are unequal.

2. Apparatus as claimed in claim 1 wherein each residue is represented by the distinctive energisation of the appropriate one of $m$ leads allocated to the residues 0 to ($m-1$), respectively.

3. Apparatus as claimed in claim 2 wherein the second residue computer includes (c1) a gating matrix connected to each array other than one of the two end arrays, (c2) each matrix having $m$ control leads from the residue network of the array itself to represent the array residues of that array, (c3) each matrix also having $m$ input leads and $m$ output leads, (c4) the $m$ input leads to the matrix of the array next to said one end array being connected each to each to the $m$ control leads from the residue network of said one end array to represent the residues thereof, (c5) the $m$ input leads to each of the other matrices being connected each to each to the $m$ output leads from the matrix of the next array in the direction of said one end array, (c6) the $m$ output leads from the matrix of the other end array being connected to the comparator, (c7) each matrix further including gating stages so interconnecting the control leads and input leads of the matrix to the output leads thereof as to cause the output leads to represent at any given moment the residue to modulus $m$ of the algebraic sum of the residues represented at that moment by the control and input leads to the matrix.

4. Apparatus as claimed in claim 1 wherein the pulses to be counted are derived by gating a cyclic signal of other than rectangular waveform and a response is provided whenever the pulse amplitude falls below a predetermined level, including (e) means for gating the signal at two different threshold levels, and (f) means for applying the train of pulses derived from one level to the counter and the train derived from the other level to said first computer, (g) said comparator being so constructed and arranged as to not derive a response when a pulse in one train is not in coincidence with the corresponding pulse in the other train.

5. Apparatus as claimed in claim 4 wherein the comparator includes (d1) a stage for deriving from each residue signal from the second computer a pulse in part coincidence with the ensuing residue signal in the direction of counting, (d2) a gating stage for deriving a signal during such coincidence, and (d3) a further gating stage for deriving said response as the result of the coincidence of the last-mentioned signal with the residue signal from the first computer which is next in order in said direction of counting to said ensuing residue signal.

6. Apparatus as claimed in claim 1 where the scale N is the decimal scale, and wherein each residue is represented by the distinctive energisation of the appropriate one of $m$ leads allocated to the residues 0 to $(m-1)$, respectively, and the second residue computer includes (c1) a gating matrix connected to each array, (c2) each matrix having $m$ control leads from the residue network of the array itself to represent the array residues of that array, (c3) each matrix also having $m$ input leads and $m$ output leads, (c4) the $m$ input leads to the matrix of each array other than the array of the highest power being connected each to each to the $m$ output leads from the matrix of the array of next higher power, (c5) the array of the highest power including a bistable stage so driven from said array as to be in a first stable condition when the array holds digit 9 and in a second stable condition when the array holds any other digit, the bistable stage being so connected to the input leads of the matrix of said array as to apply the residue value 2 to the matrix when the stage is in its first condition and to apply the residue value 0 to the matrix when the stage is in its second condition, (c6) the $m$ output leads from the matrix of the array of lowest power being connected to the comparator, (c7) each matrix further including gating stages so interconnecting the control leads and input leads of the matrix to the output leads thereof as to cause the output leads to represent at any given moment the residue to modulus $m$ of the algebraic sum of the residues represented at that moment by the control and input leads to the matrix.

7. Apparatus for checking an electronic counter of electrical pulses which operates on a scale $N_1$ and a scale $N_2$ in cascade and has for each power of said scales to the limit required an array of $N_1$ digit-representing stages and an array of $N_2$ digit-representing stages including (a) a first scale-of-$m$ residue computer, where $m$ is an integer such that each of the residues of $N_1$ and $N_2$ to modulus $m$ is unity, for producing at any given moment a first computed signal to represent the residue to modulus $m$ of the algebraic total of pulses delivered to the counter up to that moment, (b) each array of the counter including a residue network arranged to produce at any given moment an array residue signal to represent the residue to modulus $m$ of the digit held in that array at that moment, (c) a second scale-of-$m$ residue computer to which the array residue signals are supplied by said residue networks for producing at any given moment a second computed signal to represent the residue to modulus $m$ of the algebraic sum of the residues represented by the array residue signals at that moment, the sign of the residue derived from each array of an odd-numbered power of N being negative where the said unity residue is negative, and (d) a comparator to which the first and second computed signals are supplied by said computers, said comparator being operative to compare said signals and to derive a response when the residues represented by them are unequal.

References Cited by the Examiner

UNITED STATES PATENTS

| 2,837,278 | 6/58 | Schreiner et al. | 235—153 |
| 2,955,756 | 10/60 | Jensen | 235—61.7 |
| 3,046,623 | 7/62 | Batley | 340—146.1 |

MALCOLM A. MORRISON, *Primary Examiner.*

DARYL W. COOK, *Examiner.*